United States Patent
Hanson

(10) Patent No.: US 12,500,523 B2
(45) Date of Patent: Dec. 16, 2025

(54) SYNCHRONOUS RECTIFICATION FOR DC-DC CONVERTERS

(71) Applicant: Vitesco Technologies USA, LLC, Auburn Hills, MI (US)

(72) Inventor: Justin M. Hanson, Rochester Hills, MI (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 208 days.

(21) Appl. No.: 18/391,234

(22) Filed: Dec. 20, 2023

(65) Prior Publication Data
US 2025/0211125 A1    Jun. 26, 2025

(51) Int. Cl.
*H02M 3/335*    (2006.01)
*H02M 1/00*    (2006.01)

(52) U.S. Cl.
CPC ..... *H02M 3/33592* (2013.01); *H02M 1/0025* (2021.05); *H02M 3/33573* (2021.05)

(58) Field of Classification Search
CPC ........... H02M 1/0025; H02M 3/33592; H02M 3/33576
See application file for complete search history.

(56) References Cited

U.S. PATENT DOCUMENTS

| | | |
|---|---|---|
| 2004/0218406 A1 | 11/2004 | Jang |
| 2014/0376272 A1 | 12/2014 | Miao |
| 2015/0029762 A1* | 1/2015 | Lu ............... H02M 3/33523 363/21.17 |
| 2016/0359420 A1* | 12/2016 | Chen ............... H05B 45/10 |

FOREIGN PATENT DOCUMENTS

CN    108448898 A    8/2018

* cited by examiner

*Primary Examiner* — Alex Torres-Rivera

(57) ABSTRACT

The disclosure provides a method for enabling synchronous rectification in a converter, such as, but not limited to a CLLLC circuit. The converter includes a primary side circuit, a transformer, and a secondary side circuit. The method includes receiving a signal indicative of a current from the transformer to the secondary side circuit and measuring a duty cycle of the signal. The duty cycle includes a first pulse width being above a reference voltage and a second pulse width being below the reference voltage. The method also includes determining a difference between the first pulse width and the second pulse width and adjusting the reference voltage based on the determined difference.

12 Claims, 6 Drawing Sheets

SYNCHRONOUS RECTIFICATION FOR DC-DC CONVERTERS

TECHNICAL FIELD

The disclosure relates to a method and device for synchronous rectification of a DC-DC converter, e.g., CLLLC converter.

BACKGROUND

On-board chargers (OBC) are an essential part of Electric Vehicles (EVs) and Hybrid Electric Vehicles (HEVs). An OBC includes an AC-DC converter and a DC-DC converter. The AC-DC converter provides a power factor correction (PFC) to the power received from the electric grid during a charging phase. Bidirectional DC-DC converters are used to control the power flow between a DC bus and the battery and to provide galvanic isolation.

A CLLLC (Capacitor-Inductor-Inductor-Inductor-Capacitor) including a symmetric tank provides soft switching characteristics and is able to switch at higher frequencies. Due to its benefits, the CLLLC topology is used for the DC-DC converter of the OBC. For efficiency purposes, it is desirable to use synchronous rectification with the CLLLC topology; however, sensing the current in the transformer of the CLLLC topology can present problems for the controller due to its bidirectional nature.

SUMMARY

One aspect of the disclosure provides a method for enabling synchronous rectification in a converter, such as, but not limited to a CLLLC circuit. The converter includes a primary side circuit, a transformer, and a secondary side circuit. The method includes receiving a signal indicative of a current from the transformer to the secondary side circuit and measuring a duty cycle of the signal. The duty cycle includes a first pulse width being above a reference voltage and a second pulse width being below the reference voltage. The method also includes determining a difference between the first pulse width and the second pulse width and adjusting the reference voltage based on the determined difference.

Implementations of the disclosure may include one or more of the following optional features. In some implementations, when the difference is a positive value, the method includes increasing the reference voltage. When the difference is a negative value, the method includes decreasing the reference voltage.

In some examples, adjusting the reference voltage based on the determined difference occurs only when the difference is greater than a threshold value. The signal indicative of the current is sensed by a current sensor, the current sensor being a Hall effect sensor.

Another aspect of the disclosure provides a controller for enabling synchronous rectification in a converter such as but not limited to a CLLLC circuit. The converter includes a primary side circuit, a transformer, and a secondary side circuit. The controller is positioned on the primary side circuit. The controller includes a comparator unit that receives a signal from a current sensor, e.g., a Hall effect sensor, positioned between the transformer and the secondary side circuit. The controller also includes a PWM module that receives an analog signal from the comparator unit and outputs a digital signal indicative of a duty cycle of the received analog signal. The duty cycle includes a first pulse width being above a reference voltage and a second pulse width being below the reference voltage. The controller also includes a PWM comparator that compares the first pulse width and the second pulse width and outputs a comparison value. The comparison value may be a difference between the first pulse width and the second pulse width. The controller also includes a voltage adjust module that adjusts the reference voltage based on the comparison value.

In some implementations, when the comparison value is a positive value, the voltage adjust module increases the reference voltage. When the comparison value is a negative value, the voltage adjust module decreases the reference voltage. In some examples, the voltage adjust module adjusts the reference voltage when the comparison value is greater than a threshold value.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
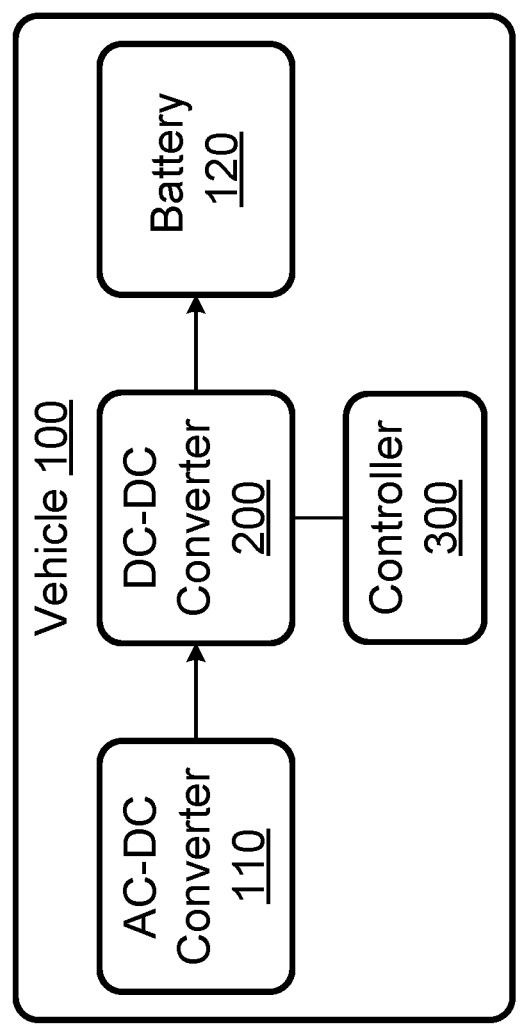
FIG. 1 is a schematic view of an exemplary electric vehicle.
Figure 2:
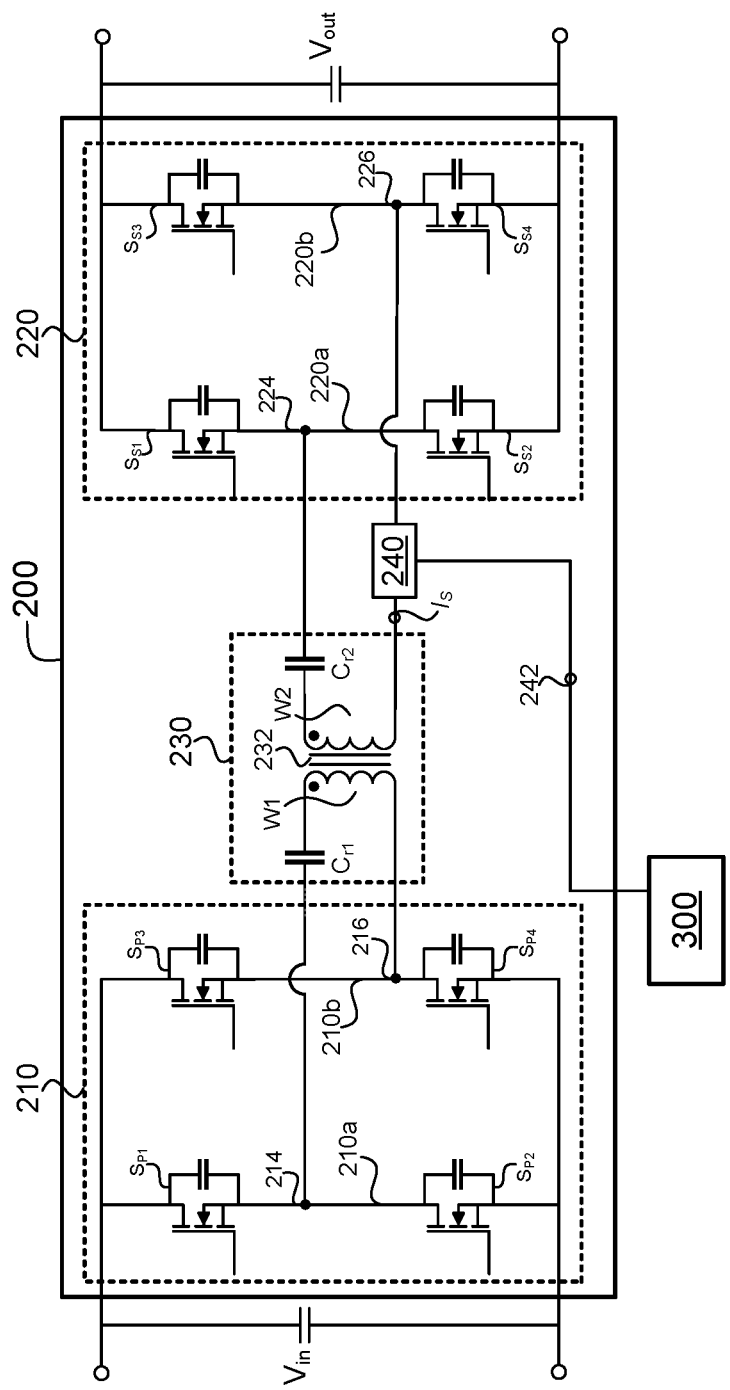
FIG. 2 is a schematic view of an exemplary DC-DC converter with a CLLLD topology.

Referring to FIGS. 1 and 2, an electric vehicle 100 includes an AC-DC converter 110 that receives energy from the grid by way of a vehicle charging plug. The AC-DC converter 110 may include a front-end power factor correction (PFC) circuit that processes the AC mains to provide a fixed DC voltage with low harmonic distortion on the grid. The DC voltage provided by the AC-DC converter 110 does not provide the needed charge voltage to charge a vehicle battery 120 as it is limited by the utility company (the PFC circuit only boosts the input voltage). Therefore, a DC-DC current control is needed in a second stage converter (i.e., DC-DC converter 200) to use the DC voltage provided by the AC-DC converter 110 for charging the battery 120.

The DC-DC converter 200 shown in FIGS. 1 and 2 is a CLLLC (Capacitor-Inductor-Inductor-Inductor-Capacitor) circuit 200 which allows for a bidirectional current. The CLLLC circuit 200 includes a primary side circuit 210, a secondary side circuit 220, and a resonant tank circuit 230. The primary side circuit 210 is connected to the AC-DC converter 110 which provides power Vin to the primary side circuit 210. The primary side circuit 210 is a full bridge circuit having a first bridge arm 210a and a second bridge arm 210b. The secondary side circuit 220 is also a full bridge circuit having a first bridge arm 220a and a second bridge arm 220b. The resonant tank circuit 230 may include a transformer, one or more resonant capacitor(s), and resonant inductors positioned on each side of the transformer 230. As shown, a magnetic element 232 is used to replace the transformer and the resonant inductors. The CLLLC circuit 200 provides a symmetric tank that allows for soft switching characteristics and is able to switch at higher frequencies. One end of a first side winding W1 of the resonant tank circuit 230 is electrically connected to a midpoint 214 of the first bridge arm 210a through a first resonant capacitor $C_{r1}$, while the other end of the first side winding W1 is electrically connected to a midpoint 216 of the second bridge arm 210b. Similarly, one end of the second side winding W2 of the resonant tank circuit 230 is electrically connected to a midpoint 224 of the first bridge arm 220a of the secondary side circuit 220 through the second resonant capacitor $C_{r2}$, while the other end of the second side winding W2 is electrically connected to a midpoint 226 of the second bridge arm 220b of the secondary side circuit 220. The secondary side circuit 220 outputs power $V_{out}$ to charge the vehicle battery 120. In some examples, the output power $V_{out}$ may be used to power and/or charge additional devices.

With continued reference to FIG. 2 each of the bridge arms 210a, 210b, 220a, 220b includes two switch groups connected in series. The midpoint of each corresponding arm is located between the two switch groups. As shown, each switch group includes at least one switch $S_{P1}$, $S_{P2}$, $S_{P3}$, $S_{P4}$, $S_{S1}$, $S_{S2}$, $S_{S3}$, $S_{S4}$, such as, but not limited to, a MOSFET. Other circuit and switch designs are also possible as long as the required function of power conversion is achieved.

In addition, a current sensor 240 is positioned on the secondary winding W2 of the transformer 230. The current sensor 240 may be an isolated current sensor, such as a Hall effect sensor. The current sensor 240 senses a secondary current $I_s$ from the resonant tank circuit 230 and measures the secondary current $I_s$ providing a current measurement signal 242.

Since synchronous rectification with CLLLC circuits is difficult to achieve due to the effect of the magnetizing current, the DC-DC converter 200 includes a controller 300 that provides an improved synchronous rectification. The bidirectional nature of the current in the transformer requires a voltage offset $V_{ref}$, so that negative currents can be effectively measured by the controller 300. The CLLLC converter 200 allows for a bidirectional signal through the transformer 230. In some examples, the reference voltage offset $V_{ref}$ of the symmetrical signal drifts due to several factors, including but not limited to, temperature. Therefore, to avoid shutting off the CLLLC converter 200 to recalibrate the reference voltage $V_{ref}$, the controller 300 measures the duty cycle of the secondary circuit 220 control signals Is in order to determine whether the reference voltage $V_{ref}$ has drifted over time. The symmetrical nature of the current in the transformer 230 ensures that the duty cycle for positive rectification will be equal to the duty cycle for negative rectification, with respect to the control period. If the duty cycles of the control signals Is are not equal, the controller 300 can determine that the reference voltage $V_{ref}$ has drifted, and can compensate for the drift without the need of measuring the reference voltage $V_{ref}$ directly. The duty cycle is a measure of the peak-to-average ratio of the input signal over time.

The controller 300 is positioned on the primary side circuit 210 so that the secondary current measurement signal 242 of the secondary current $I_s$ going from the transformer 230 to the secondary side circuit 220 are isolated to maintain galvanic separation between the charging system and the battery 120. Due to the symmetrical nature of the current through the CLLLC transformer 230, duty cycles of the secondary current $I_s$ to the secondary full bridge $S_{S1}$, $S_{S2}$, $S_{S3}$, $S_{S4}$, should be nearly identical when the zero current offset voltage $V_{ref}$ is properly centered between the positive and negative thresholds of the comparators. The controller 300 measures the duty cycles of the secondary current $I_s$ and adjust the reference voltage $V_{ref}$ to an adjusted reference voltage $V_{radj}$ to maintain the symmetry of the duty cycle of the secondary current $I_s$ with respect to the reference voltage $V_{ref}$; mainly without disabling the converter 200 to measure and adjust the zero current offset voltage $V_{ref}$.

The controller 300 receives the secondary current measurement signal 242 from the current sensor 240. The received measurement signal 242 (i.e., the isolated current sense signal) triggers the comparator unit 310 to analyze the signal 242 causing the controller 300 to send signal pulses to the switches $S_{S1}$, $S_{S2}$, $S_{S3}$, $S_{S4}$ of the secondary side circuit 220 which leads to controlling and actuating the switches $S_{S1}$, $S_{S2}$, $S_{S3}$, $S_{S4}$.

The controller 300 includes an integrated comparator unit 310 having a first comparator 312a and a second comparator 312b. Each comparator 312 amplifies the differential between two inputs and outputs the result. For example, when the input at V(+) is greater than at V(−), the comparator 312 amplifies and outputs a positive signal; when the input at V(−) is greater, the comparator 312 outputs an amplified negative signal. The comparator 312 is configured to amplify an analog input. In addition, the comparator unit 310 includes a first Digital-to-Analog Converter (DAC) 320a and a second DAC 320b. The DAC 320 receives a digital input and converts it to an analog output to be used by the first and second comparators 312a, 312b.

The controller 300 also includes a PWM (pulse width modulation) module 330 receiving the analog output signals 314a, 314b of each of the first and second comparators 312a, 312b and outputs a digital signal 330a, 330b for each of the inputted analog signal 314a, 314b. The PWM module 330 converts the analog signals 314a, 314b to digital signals 330a, 330b and measures the duty cycle of each of the received analog signal 314a, 314b. In some examples, the digital signals 330a, 330b that are outputted by the PWM module 330 are converted to analog signals at a rectification gate drive 360 so that the magnitude of the analog signals 362 control the switches $S_{S1}$, $S_{S2}$, $S_{S3}$, $S_{S4}$ of the secondary side circuit 220.

In addition, the controller 300 includes a PWM compare module 340 (i.e., PWM comparator) that compares the digital signals 330a, 330b and outputs a comparison voltage value 342 being a voltage offset. The controller 300 also includes an offset voltage adjust module 350 that adjusts the reference voltage $V_{ref}$ based on the comparison value or result 342. The voltage adjust module 350 outputs a digital adjustment to be applied to the reference voltage $V_{ref}$.

Figure 3:
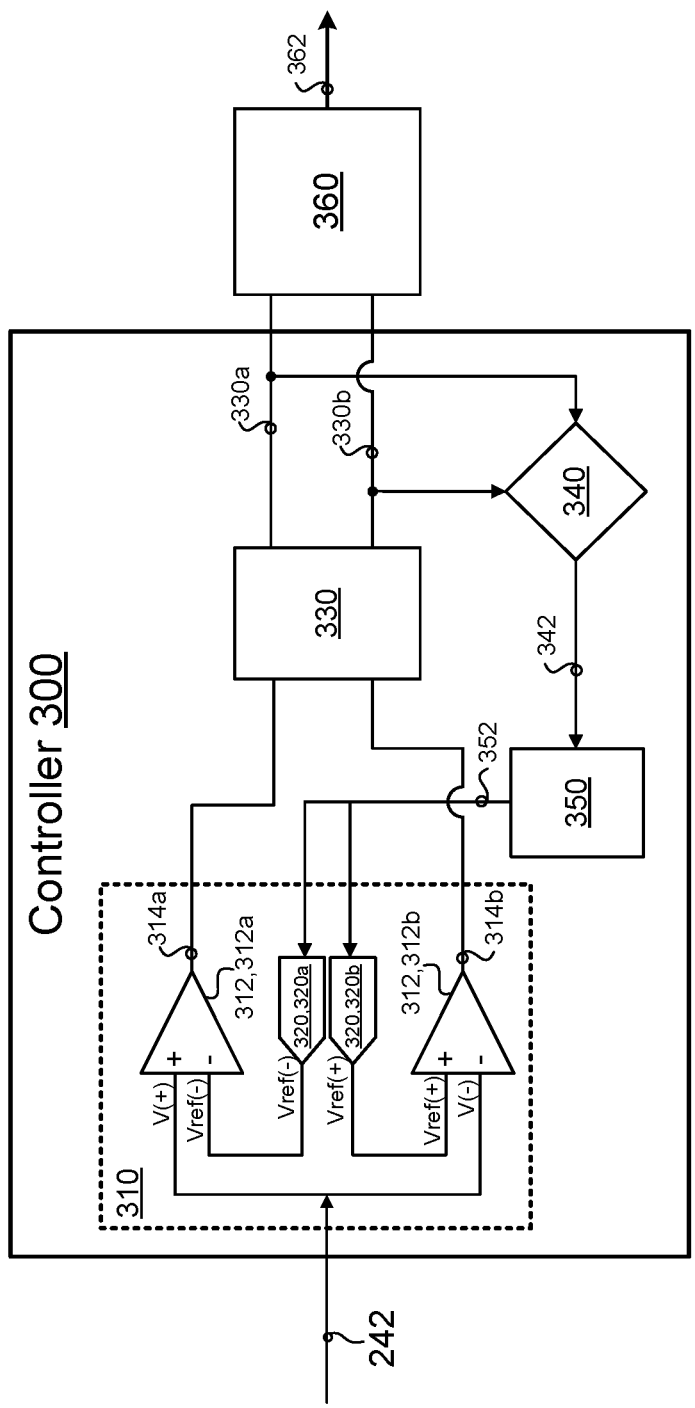
FIG. 3 is a schematic view of the exemplary controller shown in FIG. 2.
Figure 4:
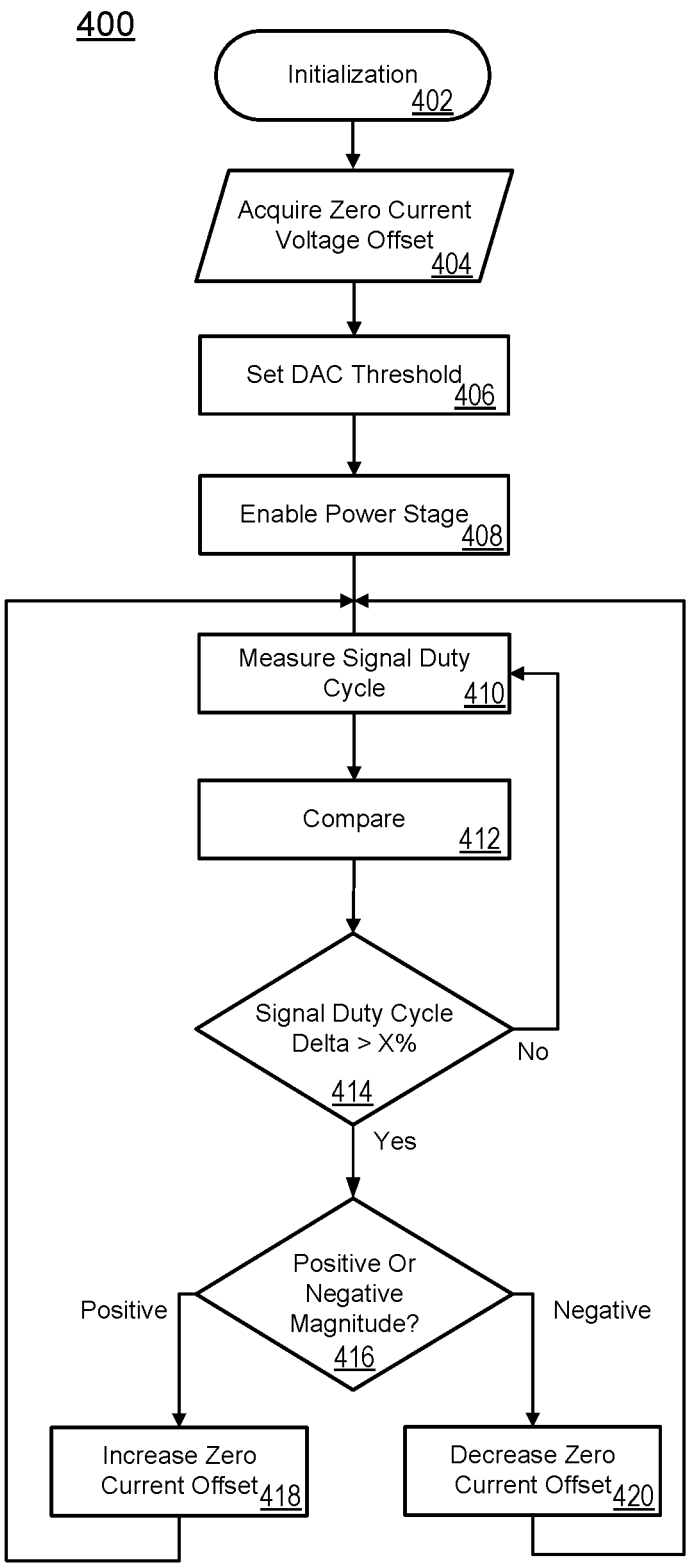
FIG. 4 is an exemplary arrangement of operations for a method of initializing and operating the DC-DC converter having a controller for adjusting a voltage offset.

FIG. 4 shows a flow chart 400 for initializing and adjusting a reference voltage $V_{ref}$ to compensate for the offset voltage drift in the CLLLC converter described in FIGS. 1-3. At block 402, the vehicle 100 is started causing all vehicle systems, including the DC-DC converter 200 to initialize.

Once the voltages of the systems have stabilized, i.e., after a predefined time, at block 404, the controller 300, i.e., the offset voltage adjust module 350, determines a digital reference voltage 352, $V_{ref,d}$ based on the measurement signal 242 outputted from the current sensor 240.

Following, at block 406, the first DAC 320a and the second DAC 320b convert the digital reference voltage 352, $V_{ref.d}$ into analog reference voltages $V_{ref}(-)$, $V_{ref}(+)$ respectively.

After the DAC threshold is set, or in other words, after the analog reference voltages $V_{ref}(-)$, $V_{ref}(+)$ are set, then at block 408, the controller 300 enables the primary power stage control signals 210.

At block 410, the PWM module 340 measures a duty cycle of the received signals 314a, 314b and outputs a digital measurement of the duty cycle 330a, 330b. In addition, the PWM module 330 determines which switches $S_{S1}$, $S_{S2}$, $S_{S3}$, $S_{S4}$ of the secondary side circuit 220 to control based on the comparator outputs 314a, 314b of the comparators 312a, 312b to allow for full bridge for synchronous rectification. For example, the PWM module 330 measures the duty cycle of the comparator outputs 314a, 314b and outputs a first digital signal 330a and second digital signal 330b. The first digital signal 330a and second digital signal 330b of the PWM module 330 are configured to adjust the behavior of a first set of switches $S_{S1}$ and $S_{S3}$ or of a second set of switches $S_{S2}$ and $S_{S4}$ based on the received output signals 314a, 314b. When the received output signals 314a, 314b are above a threshold, the PWM module 330 adjusts the first set of switches $S_{S1}$ and $S_{S3}$, and when the output signals 314a, 314b are below or equal to the threshold, the PWM module 330 adjusts the second set of switches $S_{S2}$ and $S_{S4}$.

At block 412, the compare module 340 compares the measured pulse widths 330a, 330b with each other. In some examples, the comparator 340 determines a comparison result based on the difference between the first pulse measurement and the second pulse measurement. The comparison results in an offset voltage value 342 that is used by the adjustment module 350 to adjust the reference voltage $V_{ref}$.

Referring back to FIG. 4, at block 414, the offset voltage adjustment module 350 determines if the comparison voltage value 342 is greater than a threshold X. When the voltage adjustment module 350 determines that the comparison voltage value 342 is not greater than, i.e., less than, the threshold X, then the voltage adjustment module 350 remeasures the duty cycle at block 410. However, when the voltage adjustment module 350 determines that comparison voltage value 342 is greater than, i.e., not less than, the threshold X, then at block 416, the voltage adjustment module 350 determines if the comparison voltage value 342 has a positive magnitude or a positive magnitude. When the adjustment module 350 determines that the comparison voltage value 342 has a positive magnitude, then at block 418, the adjustment module 350 increases the zero current offset value, i.e., increases the reference voltage $V_{ref}$ value to an updated $V_{radj}$. When the adjustment module 350 determines that the comparison voltage value 342 has a negative magnitude, then at block 420, the adjustment module 350 decreases the zero current offset value, i.e., increases the reference voltage $V_{ref}$ value to an updated reference voltage $V_{radj}$.

The adjusted voltage 352, $V_{radj}$ is then transmitted to the first and second DAC 320a, 320b for conversion to an analogue signal. For example, the first DAC 320a converts the adjusted signal 352 to a negative voltage signal $V(-)$, while the second DAC 320b converts the adjusted signal 352 to a positive voltage signal $V(-)$. The first comparator 312a receives the adjusted analog negative voltage signal $V(-)$ and the measurement signal 242 and compares the received signals such that when the input at $V(+)$ is greater than at $V(-)$, the comparator 312 amplifies and outputs a positive signal; when the input at $V(-)$ is greater, the comparator 312 outputs an amplified negative signal. The second comparator 312b receives the adjusted analog positive voltage signal $V(+)$ and the measurement signal 242 and compares the received signals such that when the input at $V(+)$ is greater than at $V(-)$, the comparator 312 amplifies and outputs a positive signal; when the input at $V(-)$ is greater, the comparator 312 outputs an amplified negative signal.

Figure 5:
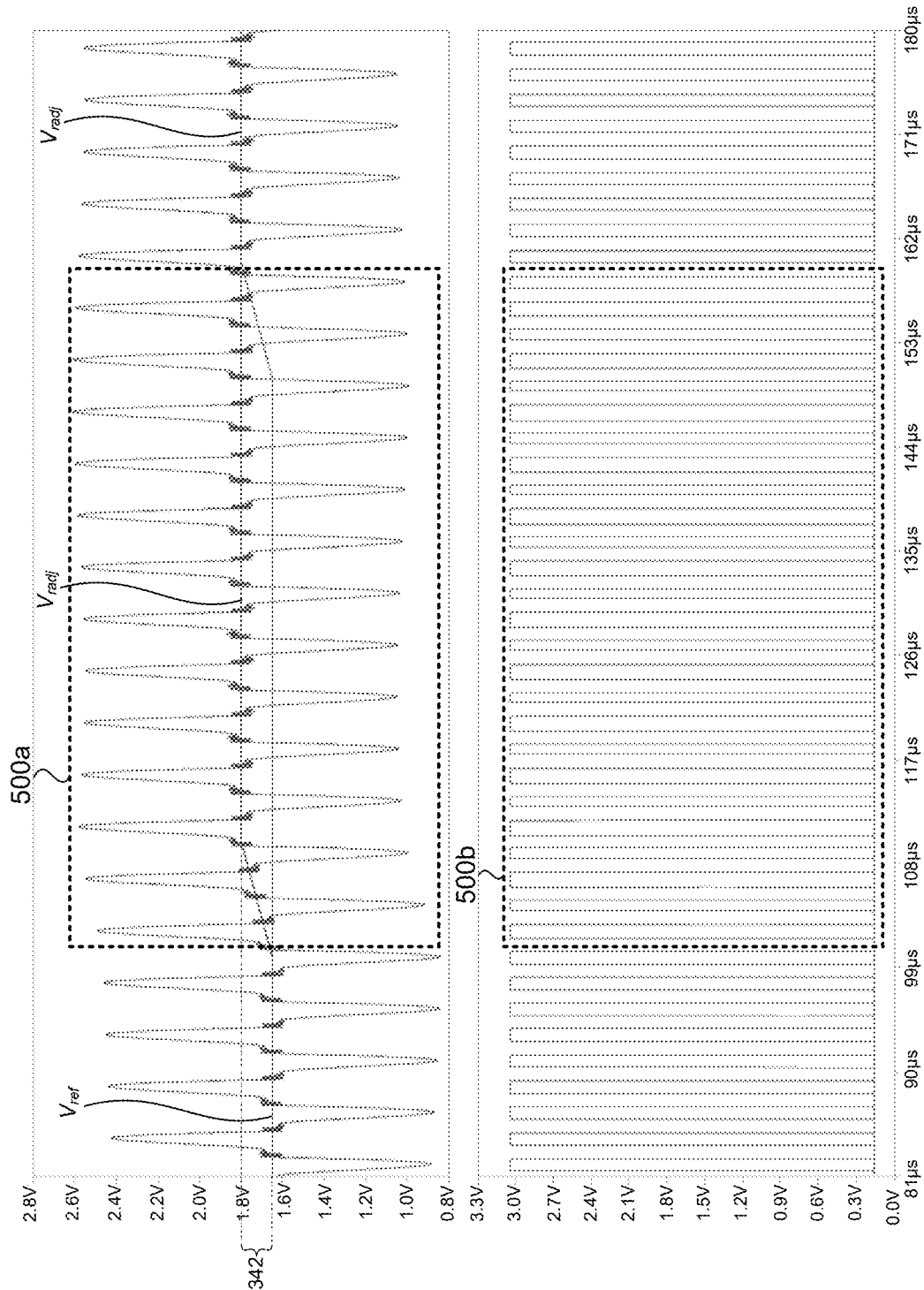
FIG. 5 is a schematic view of an offset voltage drift over time and the adjusted voltage based on the duty cycle.

FIG. 5 shows the input signals 330a, 330b and the reference voltage $V_{ref}$ in the upper graph and the pulse widths of the input signals 330a, 330b in the lower graph. Initially, the signals are equal, i.e., the time the signal spends above the reference voltage $V_{ref}$ is the same or equal to the time the signal spends below the reference voltage $V_{ref}$. However, at the beginning of window 500a, the time the signal spends above the reference voltage $V_{ref}$ is the greater than the time the signal spends below the reference voltage $V_{ref}$, which means that a drift in the reference voltage $V_{ref}$ has occurred. Additionally, as shown in window 500b, the pulse widths of the positive signal and the negative signals are not the same magnitude, i.e., therefore, an adjustment to the reference voltage is needed. As such, the compare module 340 determines the offset voltage or the comparison voltage value 342 needed such that the magnitude of the positive signal is equal to the magnitude of the negative signal. As shown in the example, the comparison voltage value 342 has a positive magnitude, causing the adjustment module 350 to increase the zero current offset value, i.e., increases the reference voltage $V_{ref}$ value to an updated reference voltage $V_{radj}$.

The addition of the described controller 300 to the DC-DC converter 200 ensures that the secondary side full bridge 220 is being actuated while the secondary winding W2 of the transformer 230 is transferring power to the output. Additionally, by taking advantage of digital power control capabilities of the controller 300, the duty cycles of the secondary current measurement signal 242 can be measured and compared to each other, and the internal comparator offset thresholds voltage $V_{ref}$ can be adjusted accordingly, without disabling the converter to measure zero current offset voltage.

Figure 6:
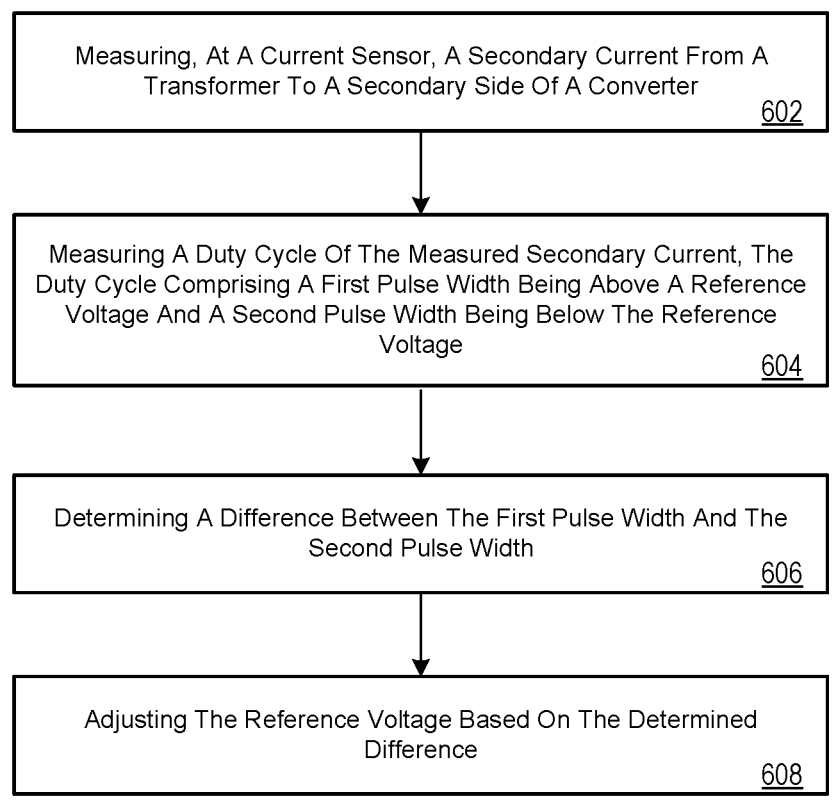
FIG. 6 is a schematic view of an exemplary arrangement of operations for a method for enabling synchronous rectification in a converter.

FIG. 6 provides an example arrangement of operations for a method 600 of enabling synchronous rectification in a converter 200 using the system of FIGS. 1-5. The converter may be a CLLLC (Capacitor-Inductor-Inductor-Inductor-Capacitor) circuit. At block 602, the method 600 includes receiving, at a controller 300, a signal 242 indicative of a current $I_s$ from the transformer 230 to the secondary side circuit 220. The signal 242 is outputted by a current sensor 240 sensing the current $I_s$ from the transformer 230 to the secondary side circuit 220. At block 604, the method 600 includes measuring, at a PWM module 300, a duty cycle of the signal 314a, 314b. The duty cycle includes a first pulse width being above a reference voltage $V_{ref}$ and a second pulse width being below the reference voltage $V_{ref}$. At block 606, the method 600 includes comparing, at a comparator 340, the first pulse width and the second pulse width or determining, at the comparator 340, a difference between the first pulse width and the second pulse width. At block 608, the method 600 includes adjusting, at an adjustment module 350 the reference voltage $V_{ref}$ based on the determined difference 342. In some examples, when the difference 342 is a positive value, the method 600 includes increasing the reference voltage $V_{ref}$. Additionally, when the difference 342 is a negative value, the method 600 includes decreasing the reference voltage $V_{ref}$. In some implementations, the method 600 includes adjusting the reference voltage $V_{ref}$ when the difference 342 is greater than a threshold value X.

It should be understood that any of the controllers described herein may utilize one or more computing devices to implement its various functionality. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices described above can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices (and utilized by the controller) and described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

A number of implementations have been described. Nevertheless, it will be understood that various modifications may be made without departing from the spirit and scope of the disclosure. Accordingly, other implementations are within the scope of the following claims.

What is claimed is:

1. A method for enabling synchronous rectification in a converter, the converter having a primary side circuit, a transformer, and a secondary side circuit, the method comprising:
   receiving a signal indicative of a current from the transformer to the secondary side circuit;
   measuring a duty cycle of the signal, the duty cycle comprising a first pulse width being above a reference voltage and a second pulse width being below the reference voltage;
   determining a difference between the first pulse width and the second pulse width; and
   adjusting the reference voltage based on the determined difference.

2. The method of claim 1, wherein when the difference is a positive value, increasing the reference voltage.

3. The method of claim 1, wherein when the difference is a negative value, decreasing the reference voltage.

4. The method of claim 1, further comprising:
   adjusting the reference voltage based on the determined difference when the difference is greater than a threshold value.

5. The method of claim 1, wherein the converter comprises a CLLLC (Capacitor-Inductor-Inductor-Inductor-Capacitor) circuit.

6. The method of claim 1, wherein the signal indicative of the current is sensed by a current sensor, the current sensor being a Hall effect sensor.

7. A controller for enabling synchronous rectification in a converter, the converter having a primary side circuit, a transformer, and a secondary side circuit, the controller positioned on the primary side circuit, the controller comprising:
   a comparator unit receiving a signal from a current sensor positioned between the transformer and the secondary side circuit;
   a PWM module receiving an analog signal from the comparator unit and outputting a digital signal indicative of a duty cycle of the received analog signal, the duty cycle comprising a first pulse width being above a reference voltage and a second pulse width being below the reference voltage;
   a PWM comparator comparing the first pulse width and the second pulse width and outputting a comparison value; and
   a voltage adjust module adjusting the reference voltage based on the comparison value.

8. The controller of claim 7, wherein when the comparison value is a positive value, the voltage adjust module increases the reference voltage.

9. The controller of claim 7, wherein when the comparison value is a negative value, the voltage adjust module decreases the reference voltage.

10. The controller of claim 7, wherein the voltage adjust module adjusts the reference voltage when the comparison value is greater than a threshold value.

11. The controller of claim 7, wherein the converter comprises a CLLLC (Capacitor-Inductor-Inductor-Inductor-Capacitor) circuit.

12. The controller of claim 7, wherein the current sensor is a Hall effect sensor.

* * * * *